United States Patent [19]
Connell

[11] Patent Number: 6,151,866
[45] Date of Patent: Nov. 28, 2000

[54] METHOD FOR PACKAGING CHICKEN PARTS

[75] Inventor: Douglas Robert Connell, St. Cloud, Minn.

[73] Assignee: JFC Inc., St. Cloud, Minn.

[21] Appl. No.: 09/225,591

[22] Filed: Jan. 6, 1999

[51] Int. Cl.$^7$ ................................................ B65B 21/06
[52] U.S. Cl. .......................... 53/443; 53/502; 53/501; 209/657
[58] Field of Search ........................... 53/443, 502, 154, 53/475, 501, 147; 209/657, 656; 177/145

[56] References Cited

U.S. PATENT DOCUMENTS

| | | | |
|---|---|---|---|
| H1747 | 9/1998 | Saeki et al. ............................. | 53/443 |
| 3,244,278 | 4/1966 | Weprin et al. ......................... | 209/121 |
| 4,428,179 | 1/1984 | Jordan et al. ........................... | 53/502 |
| 4,720,961 | 1/1988 | Jordan .................................... | 53/502 |
| 4,817,042 | 3/1989 | Pintsov .................................. | 364/478 |
| 4,927,031 | 5/1990 | Martin ................................... | 209/657 |
| 5,331,792 | 7/1994 | Kitchen ................................. | 53/502 |
| 5,406,770 | 4/1995 | Fikacek ................................. | 53/54 |
| 5,603,458 | 2/1997 | Sandolo ................................. | 241/34 |
| 5,630,309 | 5/1997 | Saeki et al. ............................ | 53/443 |
| 5,887,699 | 3/1999 | Tharpe .................................. | 198/367 |

*Primary Examiner*—Stephen F. Gerrity
*Assistant Examiner*—Sam Tawfik
*Attorney, Agent, or Firm*—Briggs and Morgan

[57] ABSTRACT

A method enabling the selective packaging of a product comprising a plurality of items of varying weights, such as chicken parts, and subsequent even-weight scannable packaging of the same. The method includes the steps of weighing each individual part; sorting each individual parts into a holding bin; accumulating a plurality of parts in each bin until a predetermined weight of parts is reached in a first of the bins; emptying the first bin of its parts; and packaging the parts in the appropriate package. The steps of emptying and packaging the parts in accord with the method of the present invention would be repeated as the bins were determined to hold the appropriate weight of product.

1 Claim, 5 Drawing Sheets

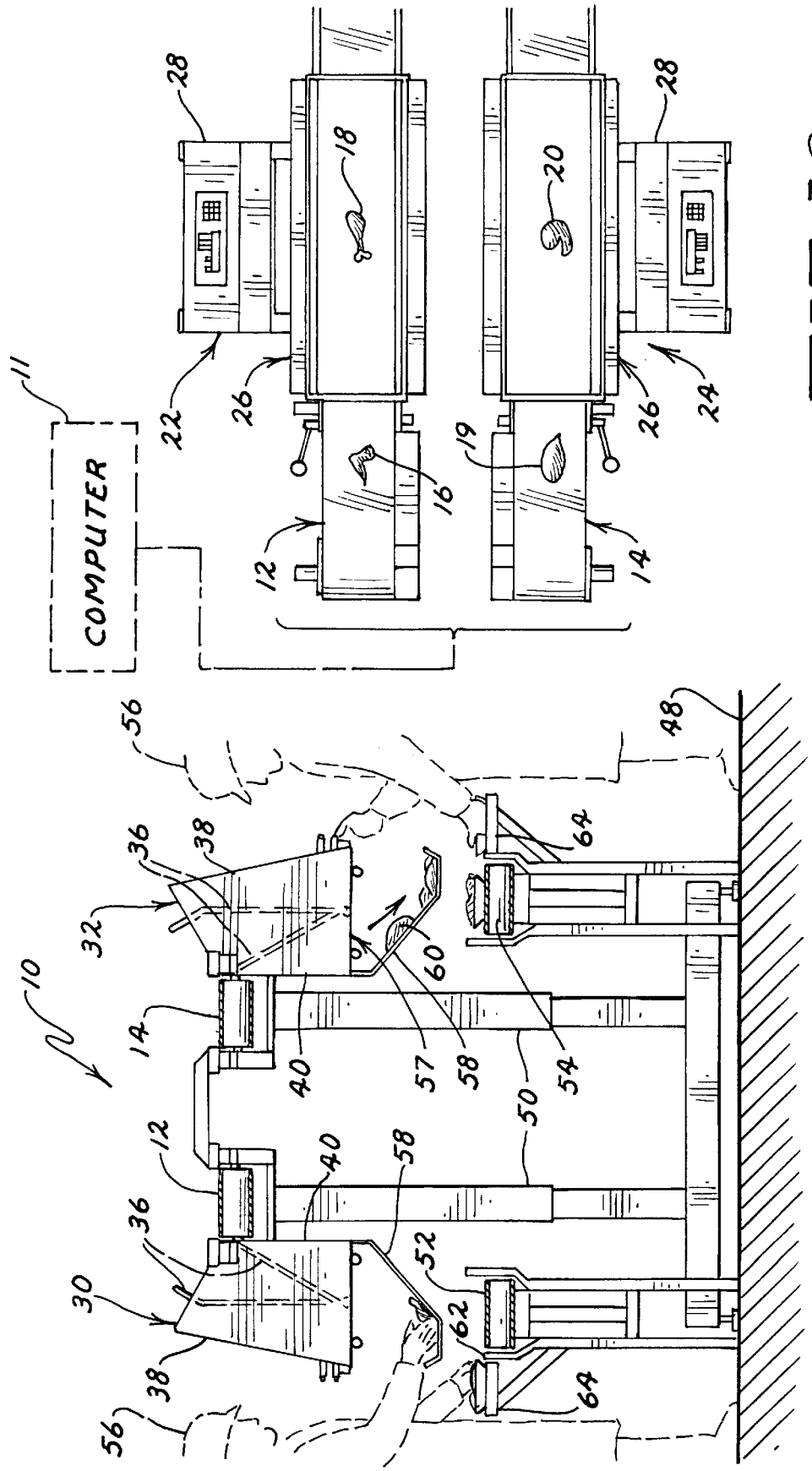

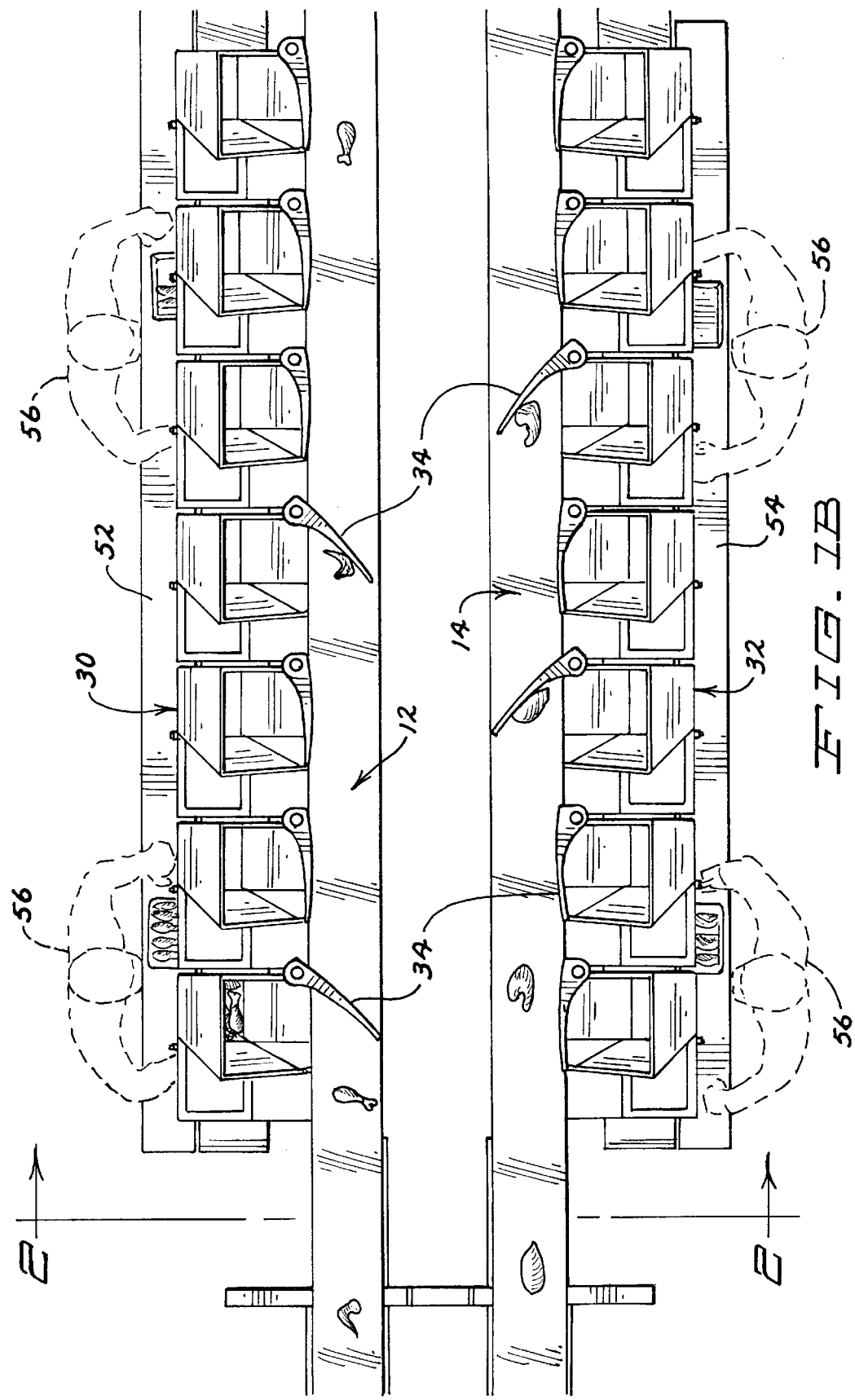

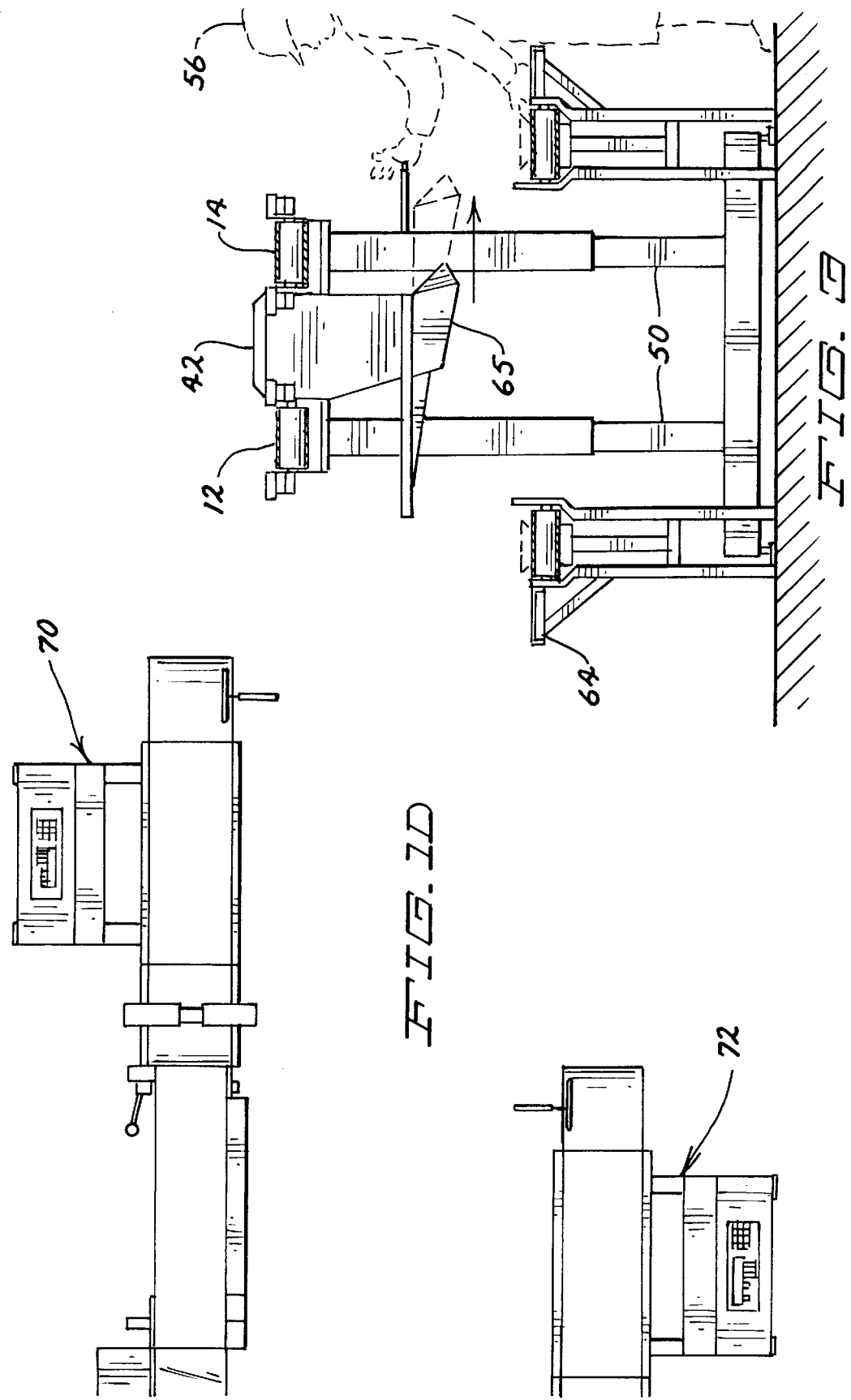

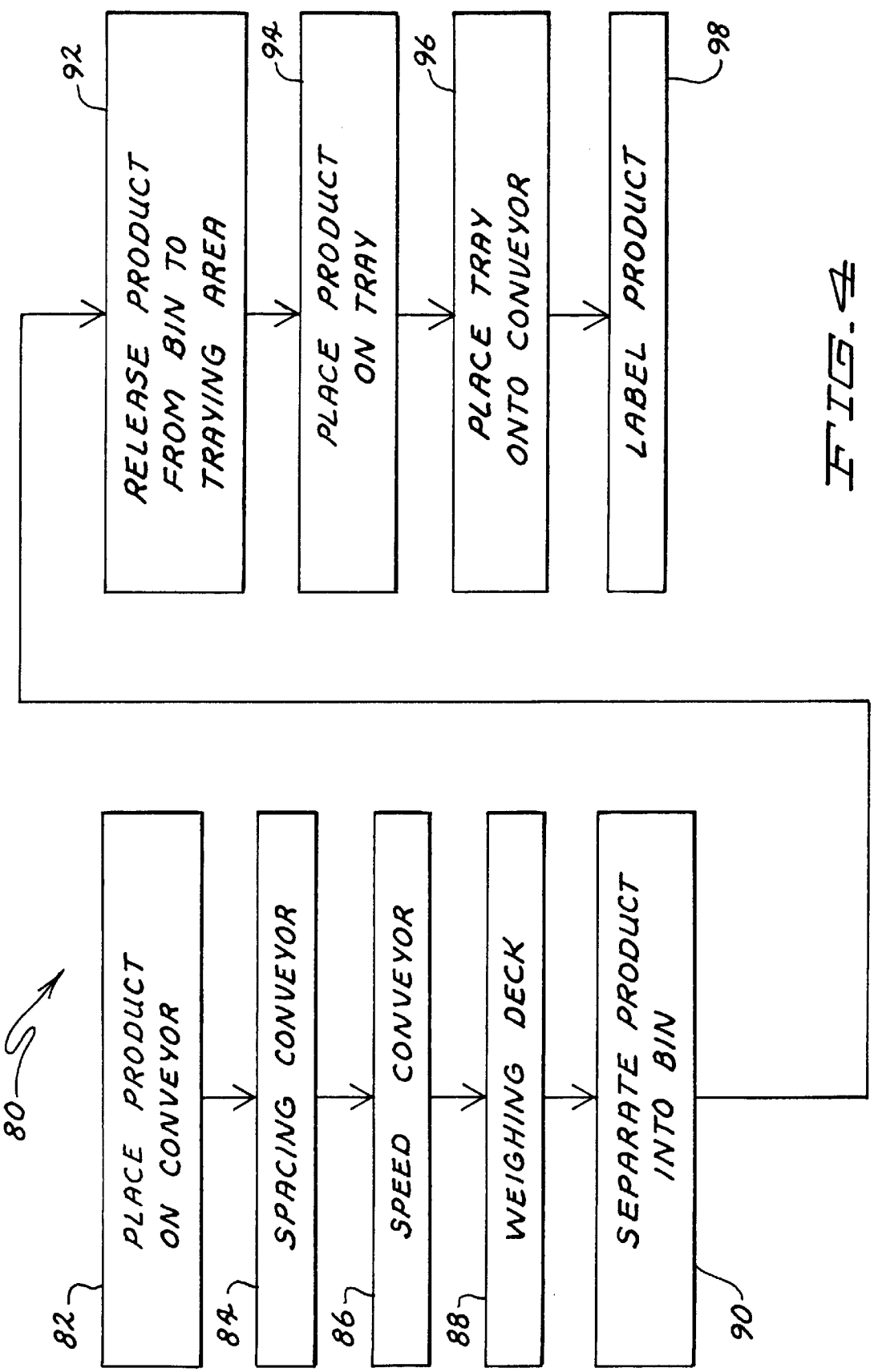

«6,151,866»

METHOD FOR PACKAGING CHICKEN PARTS

FIELD OF THE INVENTION

The present invention relates generally to an apparatus and process for providing even-weight scannable packages and in particular to an apparatus and process for providing even-weight scannable packages for whole chickens and assemblages of chicken parts.

BACKGROUND OF THE PRESENT INVENTION

Traditionally, chicken has been packaged in a variety of arrangements, including but not limited to packages of one kind of chicken parts, such as breasts, mixed part packages such as drumsticks and thighs, or "whole" chicken packages including two wings, two drumsticks, two thighs, and a breast. Generally, during the processing operation the chickens are slaughtered and then cut up into individual parts, such as breasts, drumsticks, thighs, and wings. The various parts are transported to packaging stations where they are assembled into the desired packaging configurations, labeled appropriately, wrapped in cellophane, chilled, and either weighed for individual pricing or packed into a cardboard container, and then weighed as a catch weight container. All of the product is packaged without the goal of achieving certain product weight, such as one or two pounds, and then later marked with bar code label for sale in the store. The packaging of chicken parts is as yet a labor intensive process requiring human workers to place the chicken parts into the packages and then wrap them with a transparent wrapping. The need for human intervention in the packaging process is due to the odd shapes and varying sizes of the various chicken parts as well as the need to precisely place them in a package so as to reduce the cost of packaging.

Another factor affecting the cost of packaging chicken is the varying weights of the chicken parts. Packaged chicken parts are most often sold by weight as noted above. The parts do not have a uniform weight, however, which makes sales by weight expensive for the processor. For example, it would be desirable for the processor to sell to the retail store packages of chicken parts that are labeled with bar codes so that the retailer can then sell the packages using conventional scanning equipment to store and record the price of the package. This is currently done, but at great cost to the packager because the individual package weight of the chicken package cannot be easily made uniform. That is, to ensure that the minimum weight of one pound is found in a package of chicken labeled as one pound the processor may include parts that weigh 16² or 17 ounces or more because the parts do not have a uniform weight. Thus, the processor is in fact giving away product in order to be able to sell the product as a bar code labeled product as demanded by the retail outlet and the market. This is known as overpacking and as the amount of overpack increases, the profits of the processor are reduced and, vice versa, as the amount of overpack decreases, the profits of the processor increases. It is thus a desired objective of processors of all products sold by weight in uniformly labeled packages to reduce the amount of overpack. Stated otherwise, unlike cereal and other products sold by weight where the amount of overpack can minimized almost at will, providing a multitude of chicken packages for sale of uniform weight has not been economically possible using current technology and packaging equipment. It would be desirable to provide an apparatus and a method of reducing the amount of overpack in a package of product composed of a varying number of individual parts of non-uniform weight.

SUMMARY OF THE INVENTION

It is an object of the present invention to provide new and improved apparatus that is not subject to the foregoing disadvantages.

It is another object of the present invention to provide an apparatus and method that reduces the amount of overpack in a package comprising a variety of parts of different weights.

It is still another object of the present invention to provide an apparatus and method that reduces the amount of overpack in a package comprising a selection of chicken parts.

The foregoing objects of the present invention are provided by a method and apparatus enabling the selective packaging of a product comprising a plurality of items of varying weights, such as chicken parts, and subsequent even-weight scannable packaging of the same. In an apparatus in accord with the present invention, there is provided a parts packaging line including a pair of spaced apart conveyors each having a scale associated therewith for weighing parts being transported on the conveyors, a plurality of outer bins associated with each said conveyor for receiving an individual part from the associated conveyor according to predetermined criteria, and a plurality of inner bins for receiving an individual part from either conveyor according to predetermined criteria. An apparatus in accord with the present invention would also include a pair of packaging conveyors that would receive completed packages and carry them away for further processing.

A method in accord with the present invention of producing an even-weight scannable product comprising a plurality of individual parts each having a unique weight with a minimal amount of overpack would include the steps of weighing each individual part; sorting each individual part into a holding bin; accumulating a plurality of parts in each bin until a predetermined weight of parts is reached in a first of the bins; emptying the first bin of its parts; and packaging the parts in the appropriate package. The steps of emptying and packaging the parts in accord with the method of the present invention would be repeated as the bins were determined to hold the appropriate weight of product.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIGS. 1A–1D illustrate an embodiment of an a processing floor apparatus in accord with the present invention in a top plan view.

FIG. 2 shows a side elevation view of the apparatus in FIG. 1B taken along viewing plane 2—2.

FIG. 3 shows a side elevation view of the apparatus in FIG. 1C taken along viewing plane 3—3.

FIG. 4 is a process flow diagram in accord with the present invention.

DETAILED DESCRIPTION OF THE INVENTION

Figure 1C:
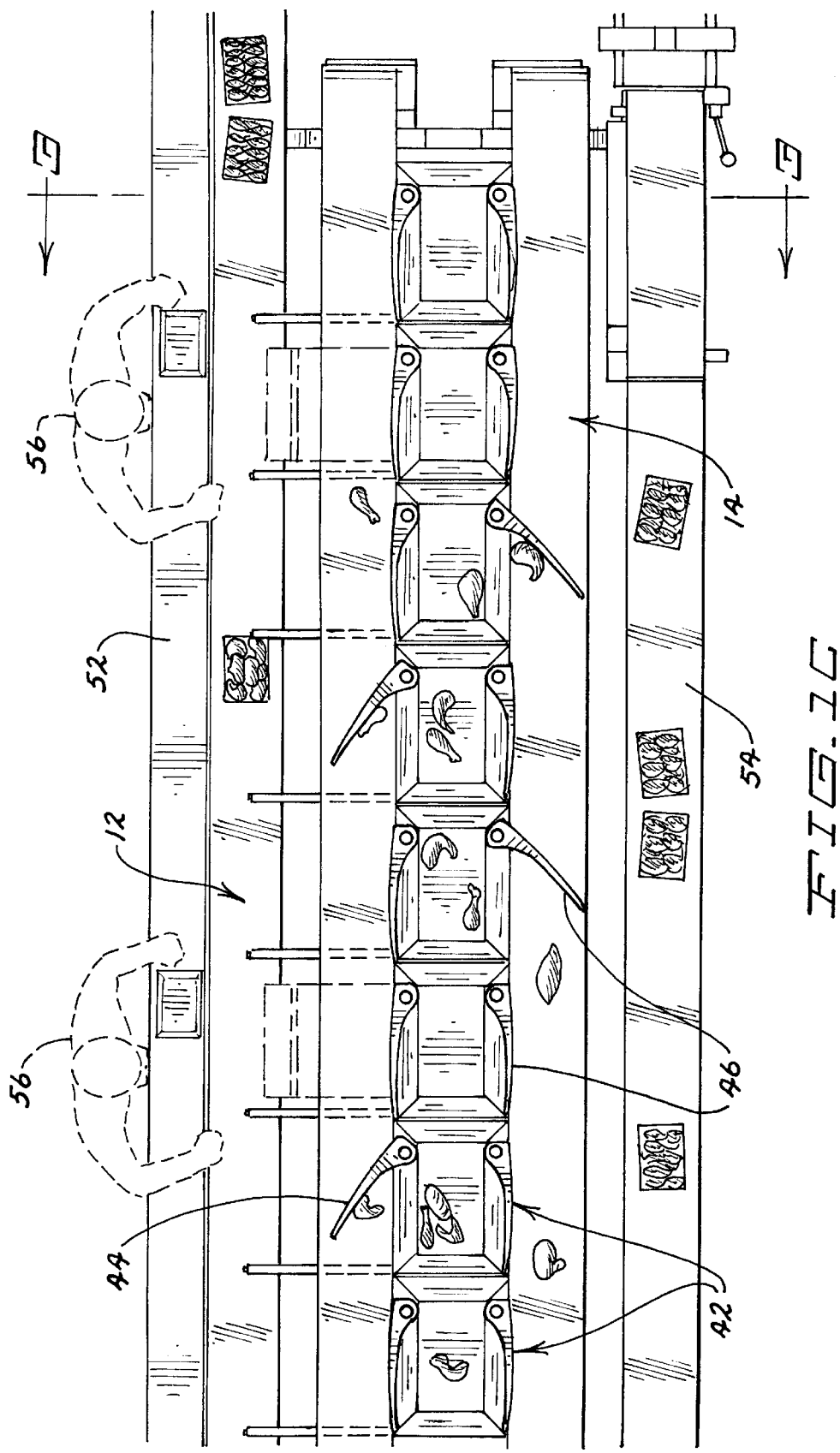

A processing floor apparatus 10 in accord with the present invention useful in producing even weight scannable chicken packages having a minimal overpack is shown in FIGS. 1A–1D. In the Figures, the processing proceeds from left to right from FIGS. 1A to 1D. The following discussing of the apparatus 10 will include references to multiple scales and conveying systems. Care will be taken in providing titles or reference names to the various items forming the apparatus, however, such titles or reference names should not be considered limiting of the present invention disclosed herein. Referring to FIGS. 1A–3, the present invention will be described, with references made to particular drawing figures where appropriate.

Apparatus 10 includes a computer or processor 11 that controls the operation of the apparatus 10 in the manner to be hereinafter described. Computer 11 is shown in phantom and communicates with the various components of the apparatus 10. Apparatus 10 also includes two pair of endless conveyors. A first pair of conveyors 12 and 14 is provided for bringing the various parts to be packaged, here chicken parts, into the packaging area of processing plant from another area of the plant, such as a cut up area. These conveyors 12 and 14 will be referred to hereafter as "parts" conveyors. As seen in FIG. 1A, the conveyors 12 and 14 are used to move various items for packaging through the packaging area. As illustrated, the parts included chicken wings 16 and drumsticks or legs 18, which are transported on conveyor 12, and breasts 19 and thighs 20, which are transported on conveyor 14. Apparatus 10 further includes a pair of scales 22 and 24, used to weigh the items carried on conveyors 12 and 14, respectively. Each scale 22, 24 includes a weighing platform 26 upon which the individual parts are weighed individually. An electronic scale unit 28 is also included in each scale 22, 24. After each item is individually weighed on the go, that is, without stopping the conveyor for a weight measurement, the conveyor moves the items onward.

As the conveyors 12 and 14 move the items onward in the packaging area, they move the items past a first plurality of temporary holding bins 30, 32 disposed on either side, that is, outwardly, of the conveyors 12 and 14. Each bin 30, 32, includes a door 34 that opens inwardly in front of the various items as they move past the bins to sweep selected items from the respective conveyor into the bins 30, 32. That is, the first and second plurality of holding bins 30, 32 each includes an extendible door 34 opening over their respective conveyor to engage and sweep a part into its respective bin. It will be understood that each bin 30, 32 may be divided into a plurality of compartments or "mini-bins", that is, separate bins that can each hold a designated number or weight of items. Thus, referring to FIG. 2, it will be seen that each of the bins 30, 32 may include at least one movable divider 36, which is shown in phantom in its two extreme positions whereby the parts are directed to one or the other of the compartments 38, 40. As seen in FIG. 1B, the items, once again, chicken parts as shown, are directed to selective bins through the selective opening of the bin doors 34 in a manner to be described hereafter.

Bins 30 and 32 are provided to enable packaging of like items or pairs of items. That is, wings 16 are directed to one of a plurality of bins and drumsticks 18 to a second plurality of bins 30 while breasts 19 and thighs 20 are directed to a respective selected pluralities of bins 32. Additionally, (with the use of the compartments 38 and 40 in particular), two items can be swept from the conveyors into a like bin or compartment to provide packaging of two kinds of items, such as wings and drumsticks on the one hand and breasts and thighs on the other, if desired.

Parts which are not directed to one of the bins 30, 32, are carried onward into the packaging area to a plurality of bins 42 that are centrally disposed between the conveyors 12 and 14, as seen in FIG. 1C. Bins 42 each include a pair of doors 44, 46. Thus, bin door 44 is openable to sweep items from conveyor 12 into its respective bin while bin door 36 is openable to sweep items from conveyor 14 into its respective bin. In this way, then, each bin 42 can sweep each type of item carried by the conveyors 12 and 14 therein to enable packaging of all four kinds of items in a single package. Alternatively, each bin could sweep two or more kinds of items into a single bin to enable packaging thereof. Thus, whereas bins 30, 32 could only sweep items from their respective conveyor, each bin 42 can sweep items from both conveyors, thus allowing packaging of any combination of parts as desired, such as, in the embodiment illustrated herein: wings and breasts; legs and thighs; breasts and legs; wings, breasts, and legs, or any other combination. In short, it provides for the packaging of "whole" chickens comprising a pair of wings, thighs, legs, and breast halves, or any desired combination thereof. Referring specifically to FIGS. 2 and 3, it will be observed that the apparatus 10 may include a packaging station for the bins 30, 32 and a packaging station for the bins 42, respectively. It will be observed with respect to both Figures that the conveyors 12 and 14 are supported above the floor 48 by stands 50. Package conveyors 52 and 54 that carry finished, that is, completely packed, packages are shown disposed below and outwardly of conveyors 12 and 14, respectively. Thus, as is known in the art, when a bin 30, 32, or 42 is filled with the correct weight of product, an appropriate auditory or visual signal will be given to an operator 56. The operator 56 will activate a bottom door 57 and the parts held therein will drop downwardly onto the product tray bin 58, which acts as a holding tray, as indicated by arrow 60 in FIG. 2. The operator 56 can then remove the various parts and place them into a tray 62, which is held on a packaging counter 64. It will be observed that bins 42 include a bottom gate 66 that is movable in a lateral direction outwardly from the center of the apparatus 10 as indicated by arrow 68. Such movable gate 66 is desirable because of the central, distant placement of the bins 42 relative to the operator 56.

When a tray is filled with the appropriate items, the tray will be placed on the respective package conveyors 52 or 54 and carried to a final check weigh station for weighing by scales 70 and 72, respectively. From scales 70 and 72 the filled package trays will be moved to another part of the plant or manufacturing facility for further processing, such as enclosure in a cellophane or transparent wrapping material.

It will be understood that conveyors 12, 14, 52, and 54 may be of the type normally used in the particular packaging process. Where food products are to be packaged, for example, the appropriate health standards for cleanliness must be met, of course. Similarly, the scales 22, 24, 70, and 72 must be able to weigh the individual items with the required precision. It will also be understood that various bins may be utilized with the present invention.

FIG. 4 will now be referred to in a description of the inventive process that an apparatus, such as apparatus 10, may utilize. Thus, FIG. 4 illustrates a process 80 in accord with the present invention. Process 80 includes placement of the product, such as chicken parts 16–22, on the conveyor system, as indicated at 82. The product may initially be placed onto a spacing conveyor as indicated at 84 to properly space the product therealong for later operations relative to the product. From the spacing conveyor the product may be moved, if desired or required by the processing plant floor plan, to a speed or parts conveyor as at 86 for a high speed transport of the product to the weighing operation. During the transport of the product on the conveyor system, the product encounters a scale or weighing deck as at 88, where each product item is individually weighed. Each product item is then sorted according to its individual weight into a particular bin as at 90 for accumulation with the desired product items until the desired package weight is reached, at which time the product is released from the bin, as at 92, for placement thereon into the appropriate package or tray, as at 94. From there the tray or package is placed onto a packaging conveyor, as at 96, and then labeled appropriately as at 98. Additional steps may also be included in the process 80, such as a final weighing of the filled package or tray to ensure that the minimum weight requirement is met. In the process of packaging chicken parts shown in FIGS. 1–3, it will be understood that the individual weight of each part is supplied to the appropriate computer or processor 11 that decides into which bin the part will be placed based upon the weight of the part according to the appropriate algorithm. The computer will activate the appropriate bin door 34, 44, or 46 of the designated bin, to open and sweep the chicken part into the bin for accumulation of chicken parts to an appropriate weight. When the appropriate weight has been accumulated, the computer will signal the operator as noted with the appropriate auditory and or visual signal. The operator will then open the designated bin and remove the chicken parts for packaging.

The combined use of the holding bins both inside and outside the conveyors enables the most efficient use of floor space in a packaging plant as well as facilitates the reduction of overpack. By providing a pair of conveyors and disposing at least one bin disposed between them that is able to sweep parts from both conveyors, the present invention is able to reduce the overpack while maximizing the efficient use of a minimum of floor space since the apparatus is able to sort the parts into both like-item bins as well as multiple-type item bins that minimizes the use of floor space. For example, with known conveying systems that utilize a single conveyor, all kinds of parts must be placed on the single conveyor and then sorted into a plurality of longitudinally spaced bins. Floor space often limits the number of bins that can be utilized and thus reduces the ability to reduce overpack to a minimum. Placement of the bins between a pair of conveyors also enables shorter conveyors to be used, minimizing the maintenance required on such equipment.

The present invention having thus been described, other modifications, alterations, or substitutions may now suggest themselves to those skilled in the art, all of which are within the spirit and scope of the present invention. For example, while a computer has been referenced as controlling the distribution of the various product items between the bins, any logic unit capable of performing such an activity could be used. It is therefore intended that the present invention be limited only by the scope of the attached claims below.

What is claimed is:

1. A method of producing an even-weight scannable product comprising a plurality of like and unlike chicken parts each having a unique weight with a minimal amount of overpack, said method comprising:

weighing each chicken part;

sorting each chicken part into a holding bin, said sorting based upon the type of chicken part, the weight of the chicken part being sorted, and the total weight of chicken parts in the holding bin, accumulating a plurality of parts in each bin until a predetermined weight of parts is reached in a first of said bins;

emptying said first bin of said parts; and packaging said parts wherein said parts are chicken parts and said method includes packaging a plurality of like parts and a plurality of unlike parts and wherein said method includes accumulating a plurality of like parts in a first plurality of holding bins and a plurality of unlike parts in a second plurality of holding bins.

* * * * *